(12) United States Patent
Evers

(10) Patent No.: US 10,376,893 B2
(45) Date of Patent: Aug. 13, 2019

(54) CHAIN LINK, SUPPORT CHAIN, AND SUPPORT DEVICE

(71) Applicant: Nordischer Maschinenbau Rud. Baader GmbH + Co. KG, Lubeck (DE)

(72) Inventor: Reinhard Evers, Stockelsdorf (DE)

(73) Assignee: Nordischer Maschinebau RUD. Baader GMBH + Co., KG, Lubeck (DE)

( * ) Notice: Subject to any disclaimer, the term of this patent is extended or adjusted under 35 U.S.C. 154(b) by 1149 days.

(21) Appl. No.: 14/417,088

(22) PCT Filed: Jul. 19, 2013

(86) PCT No.: PCT/EP2013/065284
§ 371 (c)(1),
(2) Date: Jan. 23, 2015

(87) PCT Pub. No.: WO2014/016210
PCT Pub. Date: Jan. 30, 2014

(65) Prior Publication Data
US 2015/0209793 A1    Jul. 30, 2015

(30) Foreign Application Priority Data
Jul. 24, 2012   (DE) .......... 10 2012 106 708

(51) Int. Cl.
*F16G 13/04*    (2006.01)
*B02C 4/28*    (2006.01)
(Continued)

(52) U.S. Cl.
CPC .............. *B02C 4/286* (2013.01); *A22C 17/00* (2013.01); *A22C 17/004* (2013.01);
(Continued)

(58) Field of Classification Search
CPC ....... B02C 4/286; A22C 17/00; A22C 17/004; A22C 21/0023; A22C 21/0069; F16G 13/02; B30B 9/247; B30B 9/241
(Continued)

(56) References Cited

U.S. PATENT DOCUMENTS

D25,713 S    6/1896    Teale
D27,223 S    6/1897    Fletcher
(Continued)

FOREIGN PATENT DOCUMENTS

CN    101306273 A    11/2008
CN    201482299 U    5/2010
(Continued)

OTHER PUBLICATIONS

Exam Report and Search Report dated May 27, 2016 from Russian Patent Application No. 2015103807.
(Continued)

*Primary Examiner* — David B Jones
(74) *Attorney, Agent, or Firm* — David B. Tingey; Bryant J. Keller; Kirton McConkie

(57) ABSTRACT

The invention relates to a chain link for a support chain for supporting a compression belt in a separating device for separating materials of different flowability, the chain link having a support surface and an inner surface opposite said support surface and is characterized in that a protruding support element is arranged on at least one end face of the chain link so as to form an undercut. The invention further relates to a support chain for a support apparatus for supporting a compression belt in a separating device for separating materials of different flowability, the support chain being an articulated chain which has individual chain links connected to each other in an articulated manner, the chain links being threaded onto chain pins extending transverse to
(Continued)

Figure 1:
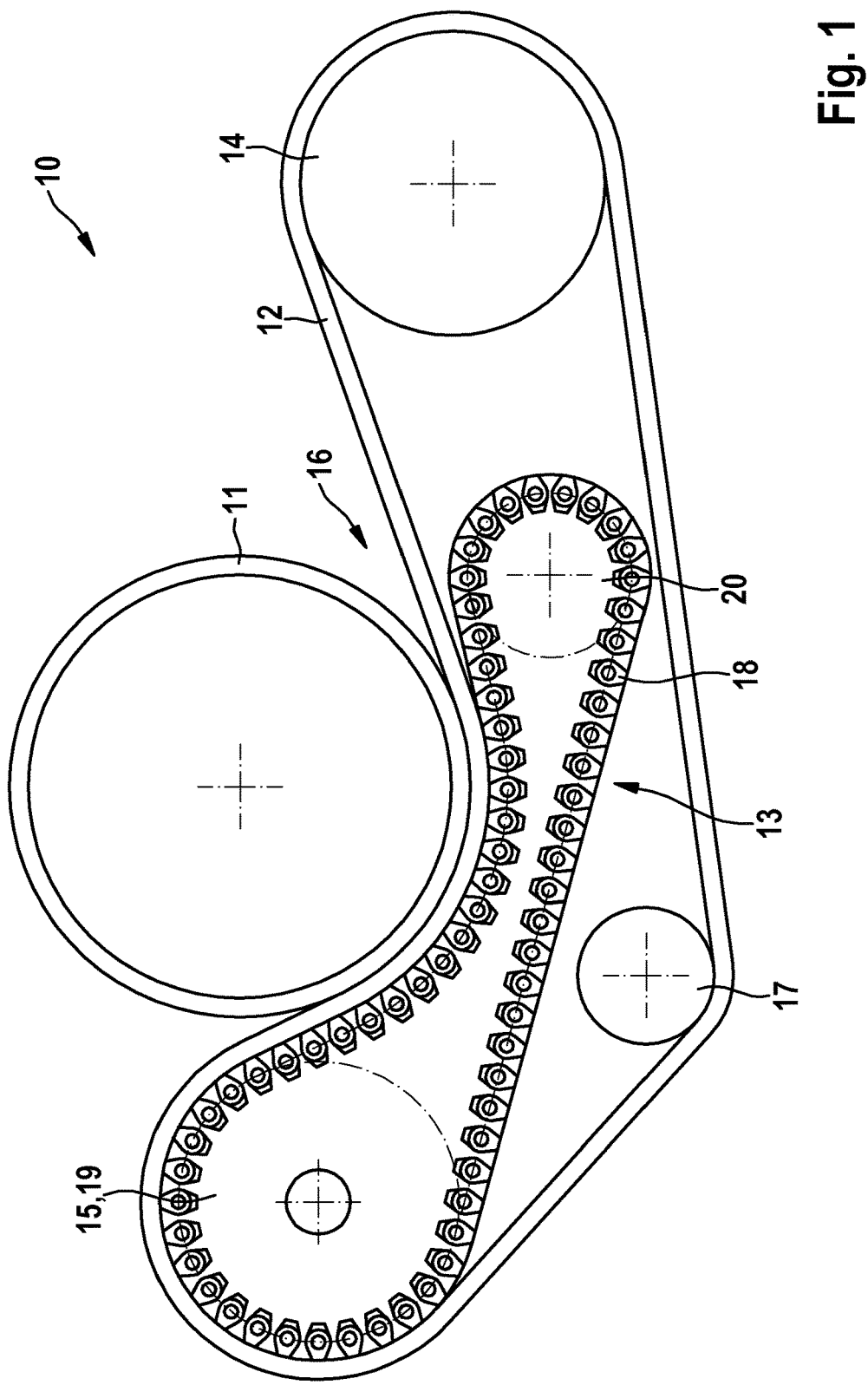

the conveying direction F with the chain links according to the invention. The invention also relates to a support apparatus having the support chain according to the invention.

12 Claims, 5 Drawing Sheets

(51) Int. Cl.
*B30B 9/24* (2006.01)
*A22C 17/00* (2006.01)
*A22C 21/00* (2006.01)
*F16G 13/02* (2006.01)

(52) U.S. Cl.
CPC ...... *A22C 21/0023* (2013.01); *A22C 21/0069* (2013.01); *B30B 9/241* (2013.01); *B30B 9/247* (2013.01); *F16G 13/02* (2013.01)

(58) Field of Classification Search
USPC .................................. 59/5, 78; 474/212, 213
See application file for complete search history.

(56) References Cited

U.S. PATENT DOCUMENTS

| | | |
|---|---|---|
| D27,465 S | 8/1897 | Fletcher |
| D30,242 S | 2/1899 | Smith |
| D32,107 S | 1/1900 | Weaver |
| 2,199,292 A | 4/1940 | Pierce |
| 2,784,836 A | 3/1957 | Le Tourneau |
| 2,966,112 A * | 12/1960 | Guettler .................. B30B 9/241 100/102 |
| 3,056,309 A | 10/1962 | Horste |
| D250,104 S | 10/1978 | Bourgeois |
| 4,526,271 A | 7/1985 | Finnighan |
| 4,615,343 A | 10/1986 | Komossa |
| 4,991,315 A | 2/1991 | Falck |
| 5,267,909 A | 12/1993 | Iacchetta |
| D373,670 S | 9/1996 | Roberts |
| D381,177 S | 7/1997 | Patois et al. |
| 5,846,149 A * | 12/1998 | Ledvina .................. F01L 1/02 474/84 |
| 5,895,880 A | 4/1999 | Golden |
| D449,416 S | 10/2001 | Horie et al. |
| 6,450,910 B1 | 9/2002 | Matsumoto et al. |
| D518,074 S | 3/2006 | Yoshida et al. |
| D528,259 S | 9/2006 | Layne et al. |
| 7,108,622 B2 | 9/2006 | Okabe |
| D544,894 S | 6/2007 | Clarke |
| D545,333 S | 6/2007 | Clarke |
| 7,500,928 B2 * | 3/2009 | Hummel .................. F16G 13/06 474/228 |
| D699,272 S | 2/2014 | Mochizuki |
| D731,569 S * | 6/2015 | Evers ........................... D15/148 |
| D734,590 S * | 7/2015 | Evers ........................... D34/29 |
| 2002/0060142 A1 | 5/2002 | Morimoto et al. |
| 2002/0086753 A1 | 7/2002 | Yahata |
| 2003/0199351 A1 | 10/2003 | Nichols |
| 2003/0236145 A1 | 12/2003 | Ledvina et al. |
| 2005/0009655 A1 | 1/2005 | Kubo et al. |
| 2005/0009656 A1 | 1/2005 | Preis et al. |
| 2005/0020395 A1 | 1/2005 | Graves |
| 2005/0090347 A1 | 4/2005 | Revankar et al. |
| 2005/0170924 A1 | 8/2005 | Meya et al. |
| 2005/0170925 A1 | 8/2005 | Hamilton |
| 2006/0094551 A1 | 5/2006 | Tohara |
| 2006/0142103 A1 | 6/2006 | Marshall |
| 2006/0252592 A1 | 11/2006 | Young |
| 2007/0272523 A1 | 11/2007 | Vietoris |
| 2010/0084319 A1 | 4/2010 | Hahn et al. |
| 2010/0236901 A1 | 9/2010 | Marshall |
| 2010/0304911 A1 * | 12/2010 | Kabai ..................... F16G 13/04 474/213 |
| 2011/0183799 A1 | 7/2011 | Young et al. |
| 2011/0278136 A1 | 11/2011 | Weiser et al. |
| 2011/0302843 A1 | 12/2011 | Dallmann et al. |
| 2012/0279832 A1 | 11/2012 | Bettari |
| 2014/0135160 A1 | 5/2014 | Kaiser et al. |
| 2014/0231226 A1 | 8/2014 | Sharma et al. |

FOREIGN PATENT DOCUMENTS

| | | |
|---|---|---|
| DE | 1030122 | 10/1958 |
| DE | 10206274 A1 | 8/2003 |
| DE | 202004014365 U1 | 12/2004 |
| DE | 102004008669 A1 | 9/2005 |
| DE | 202007004473 U1 | 7/2007 |
| DE | 602005003660 T2 | 11/2008 |
| DE | 202010011056 U1 | 12/2011 |
| EP | 1128090 A2 | 8/2001 |
| EP | 1241117 A1 | 9/2002 |
| EP | 1843061 A1 | 10/2007 |
| EP | 2034218 A1 | 3/2009 |
| EP | 2255946 A1 | 12/2010 |
| FR | 2961572 A1 | 12/2011 |
| JP | H02 138093 U | 11/1990 |
| SU | 9038 A | 4/1929 |
| SU | 965798 | 10/1982 |
| WO | 2004043833 A1 | 5/2004 |
| WO | 2008116650 A1 | 10/2008 |
| WO | 2011012410 A1 | 2/2011 |

OTHER PUBLICATIONS

International Preliminary Report on Patentability dated Jan. 27, 2015 from International Patent Application No. PCT/EP2013/065284 filed Jul. 19, 2013.
International Search Report dated Oct. 23, 2013 from International Patent Application No. PCT/EP2013/065284 filed Jul. 19, 2013.
Office Action dated Sep. 10, 2014 from U.S. Appl. No. 29/443,991, filed Jan. 24, 2013.
Notice of Allowance dated Sep. 15, 2014 from U.S. Appl. No. 29/443,992, filed Jan. 24, 2013.
Notice of Allowance dated Dec. 19, 2014 from U.S. Appl. No. 29/443,992, filed Jan. 24, 2013.
Exam Report dated Sep. 2, 2015 from Chinese Patent Application No. 201380039501.4.
Notice of Allowance dated Dec. 19, 2014 from U.S. Appl. No. 29/443,991, filed Jan. 24, 2013.
Notice of Allowance dated Feb. 20, 2015 from U.S. Appl. No. 29/443,991, filed Jan. 24, 2013.
Notice of Allowance dated May 19, 2015 from U.S. Appl. No. 291443,991, filed Jan. 24, 2013.
Notice of Allowance dated Jan. 8, 2015 from U.S. Appl. No. 29/443,992, filed Jan. 24, 2013.
Notice of Allowance dated Apr. 9, 2015 from U.S. Appl. No. 29/443,992, filed Jan. 24, 2013.

* cited by examiner

CHAIN LINK, SUPPORT CHAIN, AND SUPPORT DEVICE

The present invention relates to a chain link for a support chain for supporting a compression belt in a separating device for separating materials of different flowability, the chain link having a support surface and an inner surface opposite said support surface.

The invention further relates to a support chain for a support apparatus for supporting a compression belt in a separating device for separating materials of different flowability, the support chain being an articulated chain which has individual chain links connected to each other in an articulated manner, the chain links being threaded onto chain pins extending transverse to the conveying direction F.

The invention also relates to a support apparatus for supporting a compression belt in a separating device for separating materials of different flowability, comprising a housing with side walls, a rotationally driven hollow drum with a perforated circumferential surface, a continuous compression belt which can be pressed from outside onto said circumferential surface by winding around a portion of the circumference of the hollow drum, a product intake wedge, stripping means for stripping the compressed material on the hollow drum, the continuous compression belt being supported by means of at least two rollers, one of which is designed to be pressed separately by the compression belt elastically against the hollow drum, the support apparatus comprising a support chain.

Such chain links, support chains and support apparatuses are used in separating devices that are also referred to as separators. The separating devices generally comprise of hollow drums with perforated circumferential surfaces against which a material to be separated is pressed from outside by means of a continuous compression belt of an elastic material. The components of the material to be separated, which have greater flowability than the other components of the material to be separated, are pressed through the perforation of the circumferential surface into the inner cavity while the components with lower flowability remain on the circumferential surface of the hollow drum and are scraped off it using a scraper. For example, the separating device can be used to separate meat components from skin, sinews, bones or fish bones.

Document DE 20 2004 014 365 from the applicant's company shows such a support apparatus with a support chain for supporting a compression belt. The known support chain comprises a large number of chain links which have a central recess into which the teeth of a sprocket wheel engage. It is disadvantageous that the structure of the chain links is weakened due to the central recess which may lead to a reduced operational lifetime of the chain links depending on the load factor. Moreover, due to the spaces between the chain links of the support chain, parts of the compression belt may occasionally, particularly under great compressive pressure, get into the spaces between the chain links which may result in the compression belt being damaged.

It is therefore the object of the present invention to propose a chain link of high robustness for a support chain which at the same time reliably prevents damage to the compression belt. Furthermore, the object also consists of proposing an appropriate support chain and an appropriate support apparatus for a separating device.

The object is achieved by a chain link having the features referred to hereinbefore in that a protruding support element is arranged on at least one end face of the chain link so as to form an undercut. On the one hand, this offers the advantage that the gap between every two chain links is reduced to a minimum on the side of the chain link directed towards the compression belt. On the other hand, the gap on the inside of the chain link, i.e. on the side of the inner surface, is widened. In other words, the gap between the support elements of every two chain links is set as a minimum while the gap between the end faces of the chain links towards the inner surface, i.e. on the drive or bearing side, is designed to be increasing. Due to the minimised distance between the support elements, they form an essentially completely closed surface such that the compression belt rests, at least essentially, full-surface on the support surfaces of the chain elements. On the one hand, this achieves an even distribution of forces and, on the other hand, it reliably prevents the compression belt from intruding undesirably between the support elements and therefore prevents any possible associated damage of said compression belt. At the same time, the gap widened towards the inner surface offers the space necessary for guiding the chain links around a bearing roller, drive roller or similar without jamming.

An expedient embodiment of the invention is characterised in that the support element is arranged step-free on the support surface. In this manner, the support surface is designed to be smooth and flush. On the one hand, this ensures full-surface contact of the compression belt on the support surface and, on the other hand, it reduces wear of the compression belt and effectively prevents damage thereto.

A preferred development of the invention is characterised in that the support element is convex in at least a first transition region between the support surface and the end face. In other words, the support element is curved outwards in the first transition region. The convex shape of the support element effectively minimises the distance, referred to hereinbefore, between the respective ends of the support regions of each pair of chain links.

According to a further preferred embodiment of the invention, a second transition region between the first transition region and the inner surface is rounded. In other words, the second transition area is preferably in the shape of a circular arc. The rounded inner surface reduces the friction between the respective support surfaces during rotation of the chain links about a sprocket wheel, as the position of the chain links can be changed with minimised friction due to the rounded inner surfaces.

A further expedient embodiment of the invention is characterised in that the contour of the end face has at least one point of inflexion between the first transition region and the second transition region. Due to the point of inflexion, the contour of the end face has at least one point at which the curvature behaviour changes from a right-hand curvature to a left-hand curvature or vice versa, as a result of which the gap limited by the end faces of each pair of chain links is correspondingly tapered such that the gap is narrowed on at least one side and widened towards the other side.

According to a further preferred embodiment, the inner surface comprises a concave contact region. The concave contact region is therefore designed correspondingly to the sprocket wheel such that the chain link rests full-surface on the relevant region of the sprocket wheel. This ensures homogeneous force distribution over the entire chain link such that any high point loads otherwise occurring, which might otherwise lead to breaking of the chain link, are reliably prevented.

A further expedient embodiment of the invention is characterised in that the support surface is convexly curved. This offers the advantage that the support surfaces of the chain elements form a surface that is at least essentially closed and curved outwards when rotating around a sprocket wheel. In this way, the compression belt rests essentially full-surface on the support surfaces of the chain elements even when the chain links are rotating around the sprocket wheel.

According to a further preferred embodiment of the invention, the chain link is designed in one piece so that, on the one hand, the manufacturing costs for the chain link are reduced to a minimum and, on the other hand, the chain link withstands high mechanical loads due to the one-piece design.

The object is further achieved by a support chain of the type referred to hereinbefore in that the chain links are formed according to any one of claims 1 to 9. To avoid repetition, with regard to the advantages, reference is made to the aforementioned designs regarding the chain link according to the invention.

The object is also achieved by a support apparatus having the features referred to hereinbefore which is characterised in that the support chain is formed according to claim 10. To avoid repetition, with regard to the advantages, reference is made to the aforementioned designs of the support chain according to the invention.

One advantageous development of the invention provides for at least one of the rollers of the support apparatus being configured as a sprocket wheel, said sprocket wheel comprising a plurality of reception regions formed correspondingly to the inner surfaces of the chain links for receiving the chain links at least essentially flat. In this way, at least essentially full-surface contact of the inner surfaces of the chain links with the reception regions of the sprocket wheel is achieved such that it is guaranteed that the chain links will transmit forces evenly to the sprocket wheel via the reception regions. Thus any high point loads of the chain links and/or the sprocket wheel otherwise occurring are reliably prevented and therefore the danger of chain link breaks is virtually excluded. In other words, the inner surfaces of the chain links are correspondingly adjusted to the geometry of the reception regions or the reception regions are correspondingly adjusted to the geometry of the inner surfaces of the chain links. The reception regions as well as the inner surfaces may be of any shape with regard to their geometry as long as there is a correspondence between the reception regions and the inner surface of the chain links which permits the chain links to be received essentially or completely flat. For example, the inner surfaces may be concave while the reception regions are correspondingly convex or vice versa. The reception regions and the inner surfaces of the chain links may also be formed as flat surfaces. In this case, the sprocket wheel corresponds essentially in cross-section to a polygon. The reception regions of the sprocket wheel as well as the inner surfaces of the chain links, however, are not limited exclusively to the aforementioned geometries.

According to a further preferred embodiment of the invention, the support apparatus is characterised in that, arranged between the reception regions, there is in each case at least one driver element formed for engaging in a gap between every two of the chain links, said gap being limited by the respective end faces and the support elements. Forces are transferred by means of the driver element in or counter to the conveying direction F via the end faces between the chain links and the sprocket wheel. In this way, the chain links can be driven or braked by means of the sprocket wheel.

Figure 2:
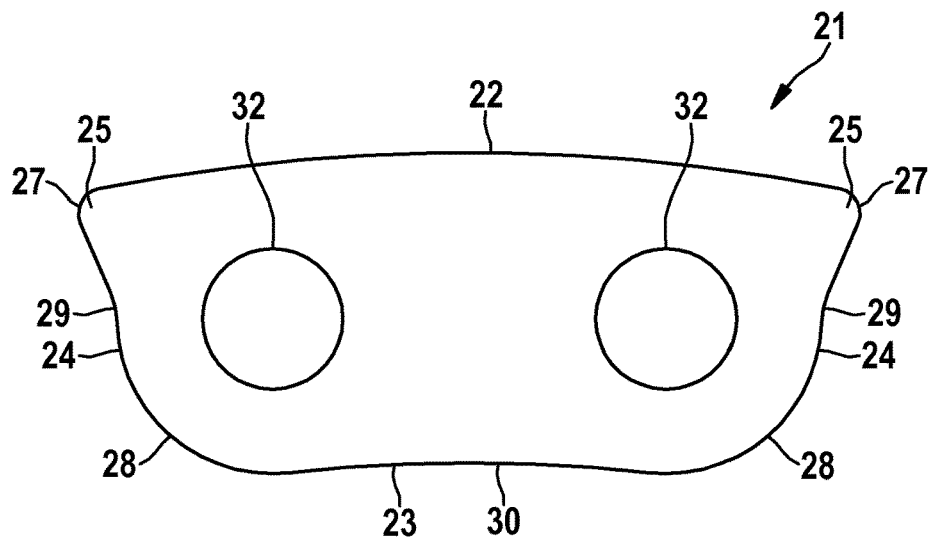
Figure 3:
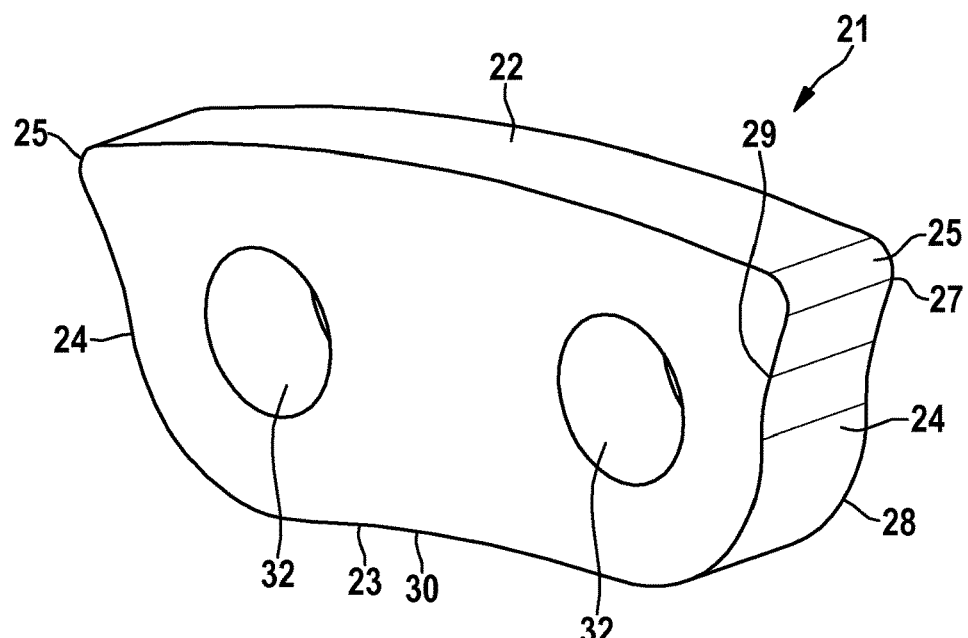
Figure 4:
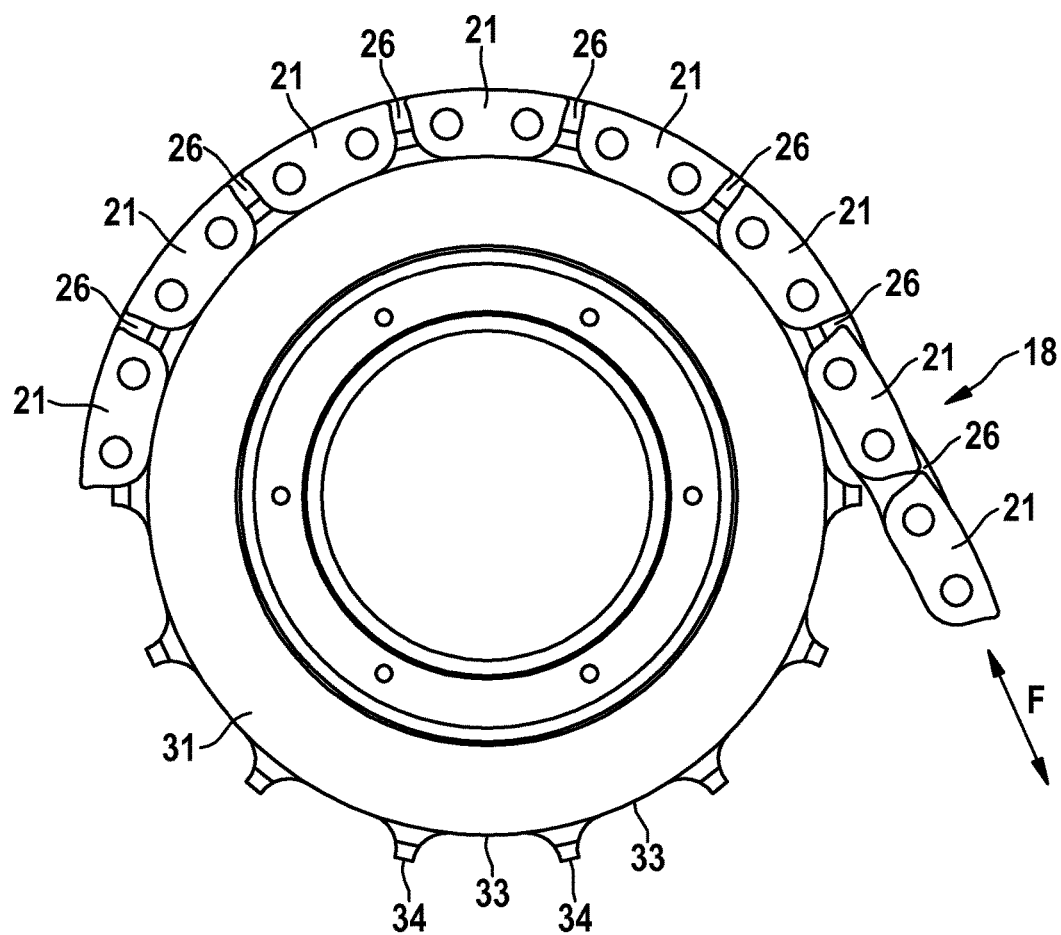
Figure 5:
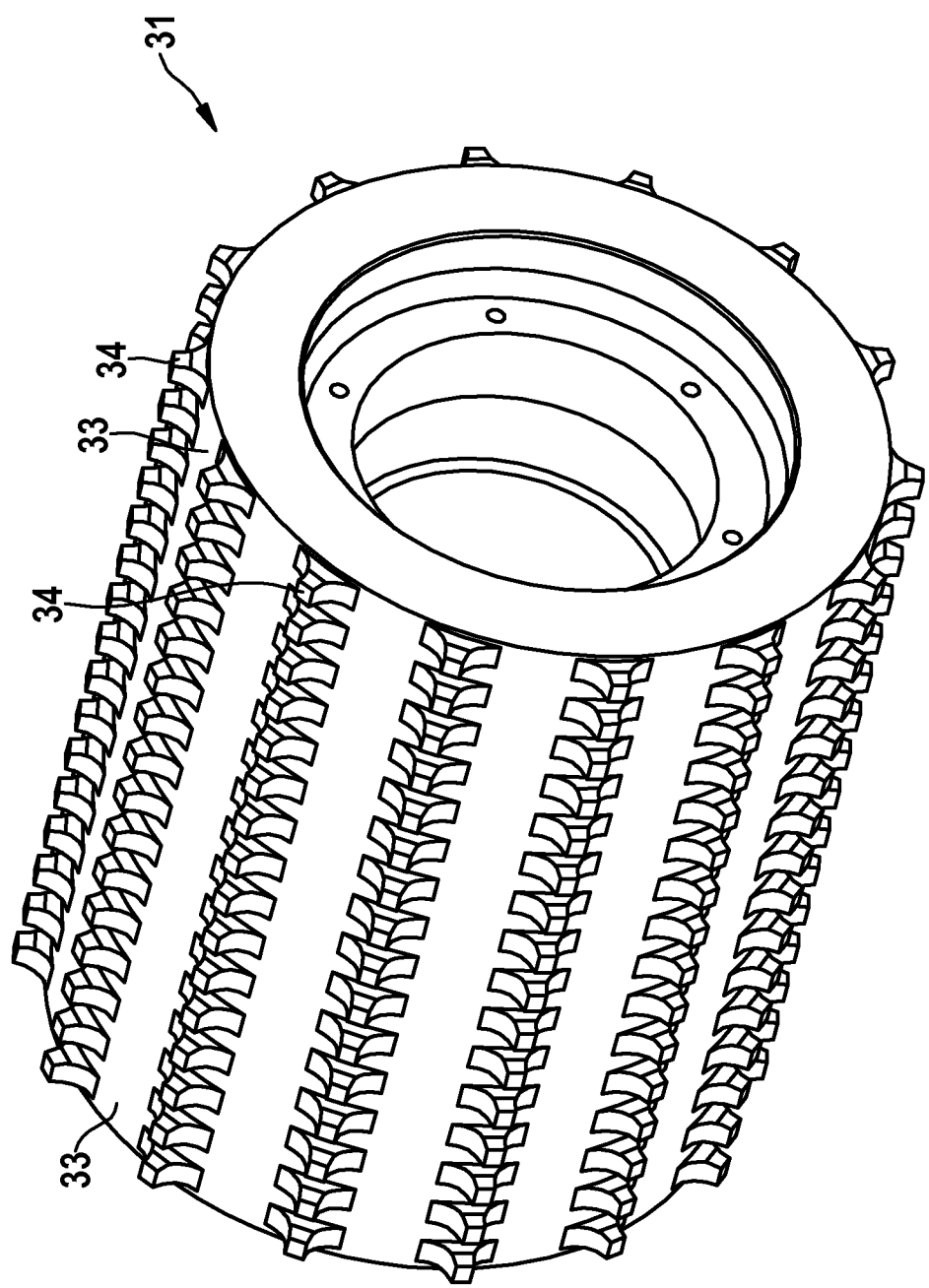
Figure 6:
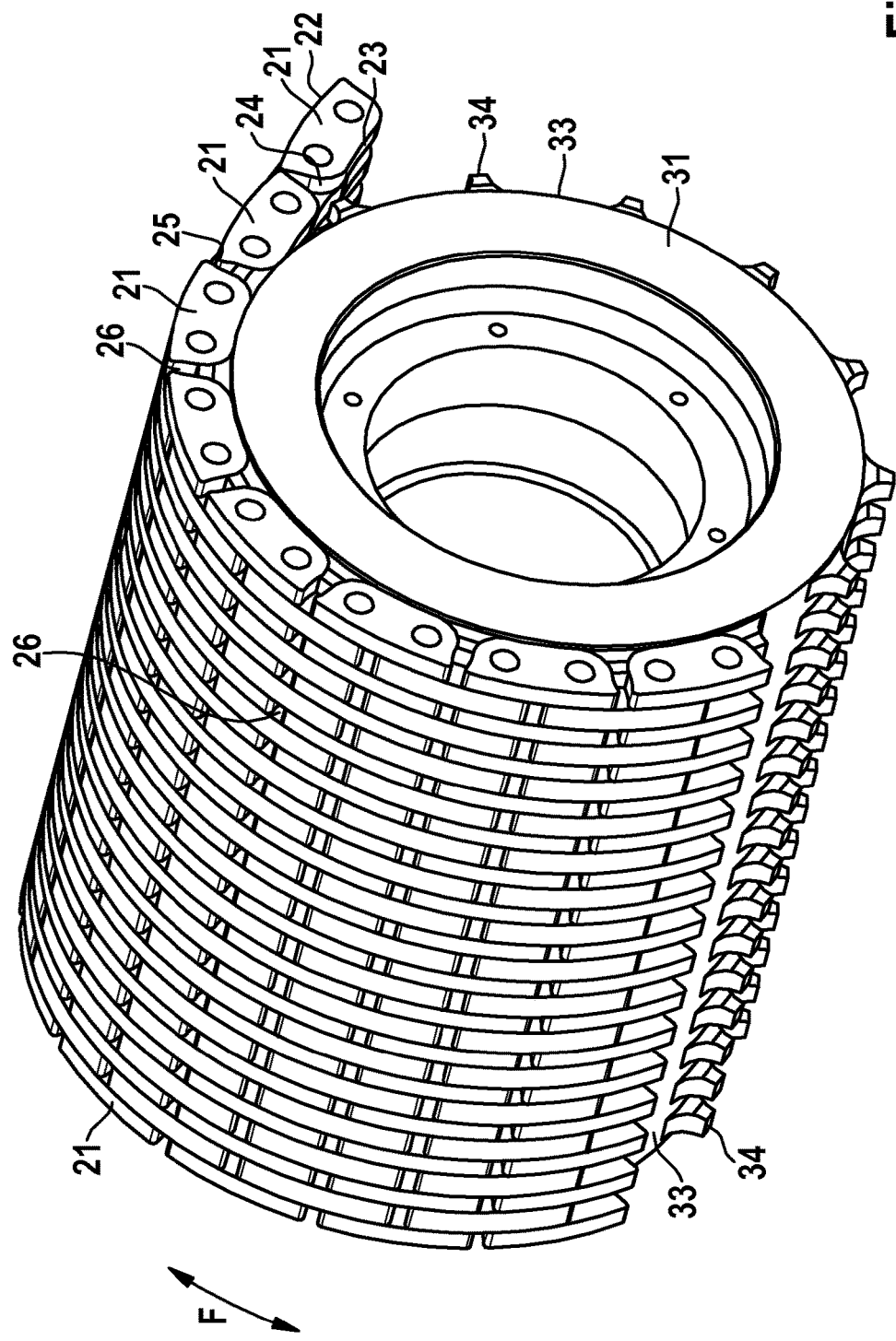

Further preferred and/or expedient features and embodiments of the invention emerge from the sub-claims and the description. Especially preferred embodiments are explained in greater detail with reference to the attached drawing. The drawing shows:

FIG. 1 a schematic representation of a separating device having a support chain as part of a support apparatus in lateral view, FIG. 2 a plan view of the chain link, FIG. 3 a perspective view of the chain link, FIG. 4 a plan view of the sprocket wheel with a section of the support chain guided over it, FIG. 5 a perspective view of the sprocket wheel and FIG. 6 a perspective view of the sprocket wheel with a section of the support chain guided over it.

The support chain shown is used for supporting a compression belt in a separating device for separating materials of different flowability. Naturally, the support chain can also be used in other fields and for other purposes.

For a better understanding, a separating device 10, which uses the support chain according to the invention described in greater detail below, the support apparatus and the chain links according to the invention, will be described first with reference to FIG. 1.

The separating device 10 illustrated comprises a rotationally driven hollow drum 11 which has a circumferential surface pierced with perforations. The hollow drum 11 rotatably supported in a frame (not shown in FIG. 1) is wrapped over a portion of its circumference by a continuous squeezing belt 12 (also referred to in the following as a compression belt), which consists of an elastic material such as rubber, polyurethane or the like, either in the form of an integral web or braided. Alternatively, the compression belt has any other belt structure, for example, the compression belt is constructed as a sandwich belt, i.e. the belt consists of a plurality of layers of the same or different material arranged one above the other. A support apparatus 13 is provided to support squeezing belt 12 for the purpose of preventing product bags in the region of the loop.

The compression belt 12 is guided via bearing rollers 14, 15 of which the roller 15 is configured as a driven pressure roller, with the help of which the compression belt 12 can be pressed against the hollow drum 11. The roller 14 is designed as a tension roller and is arranged in such a way that the compression belt 12 forms a product intake wedge 16 with the hollow drum 11. A guiding roller 17 serves as deflecting roller and spacer in order to distance the returning sections of the compression belt 12 and the support apparatus 13 respectively from each other. Located in the upper region of the periphery of the hollow drum 11 are stripping means (not illustrated) which comprise a stripping blade which is in operative connection with the outer circumferential surface of the hollow drum 11.

The support apparatus 13 or the support element is configured here as a support chain 18 which is held by bearing rollers 19, 20, the roller 19 being designed as a drive roller and the roller 20 as a tension roller, with the help of which the pressing force which the support chain 18 exerts on the compression belt 12 can be adjusted. It is particularly favourable in this case if the roller 20 is in such operative connection with the roller 19 that the pressing force of the support chain 18 on the compression belt 12 is readjusted by moving the roller 20, for example by using a hydraulic system or one or a plurality of springs. As a result of this it is possible that when, for example, the compression belt 12 is pressed away from the hollow drum 11 due to the mechanical resistance of the compressed material, the roller 20 traces it in a movement directed towards the hollow drum 11, as a result of which the pressing force of the support chain 18 onto the compression belt 12 thus remains constant overall. The roller 15 is used in this embodiment as a drive roller for both the compression belt 12 and also the support chain 18 and is therefore identical to the roller 19. The synchronous rotation of the compression belt 12 and the support chain 18 within the winding region is achieved in that, near the roller 15, 19, the compression belt 12 is in close contact with the side of the support chain 18 directed outwards, with the result that, based on friction alone, the compression belt 12 and the support chain 18 are driven at the same peripheral speed and therefore rotate equally fast in the region of the loop.

FIGS. 2 and 3 show a chain link 21 according to the invention of the support chain 18 formed from a large number of chain links 21 each in a plan view or in a perspective view. The chain link 21 comprises a support surface 22 and an inner surface 23 opposite said support surface 22. The support surfaces 22 of the chain links 21 of the support chain 18 are arranged in each case aligned in the direction of the compression belt 12 and thus form the side of the support chain 18 that presses the compression belt 12 supportively against the hollow drum 11. The inner surfaces 23 of the chain links 21 are bearing-side or drive-side oriented in each case, i.e. arranged and aligned in such a way that they come directly into contact with the respective bearing rollers 19, 20. A protruding support element 25 is arranged on at least one end face 24 of the chain link 21 so as to form an undercut. In other words, the support surface 22 is extended in that the support element 25 protrudes beyond the end face 24. By means of the support elements 25, the gap 26 (cf. FIGS. 4 and 6) is reduced to a minimum on the side of the support surface 22 between every two of the chain links 21, while the gap 26 widens towards the side of the inner surface 23. In this manner, the support surfaces 22 form a largely closed surface with the support elements 25 which, on one hand, produces an evenly distributed contact pressure of the compression belt 12 over the surface and therefore flat contact on said compression belt 12 and, on the other hand, reliably prevents sections of the compression belt 12 from intruding into the gap 26.

The support element 25 is preferably arranged step-free on the support surface 22 such that the support surface 22 and the support element 25 define a smooth surface. A "smooth surface" is understood to be not only flat but also curved surfaces.

The support element 25 is preferably convex in a first transition region 27. The transition region 27 refers to the region between the support surface 22 and the end face 24, the transition region comprising in each case portions of the support surface 22 and the end face 24. Especially preferably, the transition region 27 is in the shape of a circular arc for at least a section. The present invention, however, is not limited to such circular arc-shaped sections, on the contrary the transition region 27 can have other convex contouring. The first transition region 27 can alternatively comprise a plurality of convex regions.

A rounded second transition region 28 is especially preferred between the first transition region 27 and the inner surface 23. For example, the transition region 28, as shown in the drawing, is in the shape of a circular arc. Alternatively, the second transition region 28 is concave, that is to say curved inwards.

According to an advantageous development of the invention, the contour of the end face 24 has a point of inflexion 29 between the first transition region 27 and the second transition region 28. The point of inflexion 29 defines that point of the contour of the end face 24 at which the algebraic sign of the curvature changes from negative to positive or from positive to negative. The contour may have a plurality of the points of inflexion 29 if necessary.

In an advantageous manner, the inner surface 23 comprises a concave contact region 30. Especially preferably, the concave contact region is in the shape of a circular arc and in particular has a radius of curvature which corresponds to the radius of curvature of a sprocket wheel 31 (cf. FIGS. 4 to 6). In this way, the fullest possible surface contact is achieved between the contact region 30 and each section of the sprocket wheel 31.

The support surface 22 is preferably convexly curved, especially preferably in the shape of a circular arc with constant radius of curvature. Thus the support surfaces 22 of the chain links 21 form an essentially cylindrical surface when winding around one of the bearing rollers 14, 15, 19, 20.

The chain link 21 is especially preferably formed in one piece. The chain link 21 is produced, for example, from one piece or is milled from a solid piece. The chain link 21 is further preferably manufactured from an elastic CrNi steel.

The chain link 21 preferably has at least two holes 32. Using the holes 32, the chain links 21 are designed and set up to be connected to each other in an articulated manner via chain pins (not illustrated). Particularly advantageously, the chain links 21—as illustrated in FIG. 6—are arranged nested or offset in relation to each other on the chain pins in such a manner that a connection is established to the adjacent chain links.

Preferably, the chain link 21, as shown in FIGS. 2 and 3, is formed symmetrically in relation to an axis of symmetry—not shown in the drawing—running centrally between the holes 32. Alternatively, the chain link 21 is formed asymmetrically. For example, the chain link 21 comprises only one of the support elements 25 on one side of the support surface 22.

FIGS. 4 and 6 show a detail of the support chain 18 according to the invention as a plan view or perspective view respectively of the sprocket wheel with a section of the support chain 18 guided over it. The support chain 18 is designed, as described previously, as an articulated chain. For this, a plurality of the previously described chain links 21 are connected to each other in an articulated manner, the chain links 21 being threaded onto chain pins—not shown in the drawing—which extend transverse to the conveying direction F.

The support apparatus described at the outset in conjunction with FIG. 1 is further characterised in that it comprises the support chain 18 according to the invention.

At least one of the rollers 15, 19, 20 is advantageously configured as a sprocket wheel 31. The sprocket wheel 31 comprises a plurality of reception regions 33 formed correspondingly to the inner surfaces 23 of the chain links 21; for the sake of greater clarity, only two reception regions are identified with reference numerals in FIG. 5 by way of example. The reception regions 33 serve to receive the chain links 21 or their inner surfaces 23 in a flat manner. In other words, the chain links 21 engage in the reception regions 33 in an at least essentially positive-locking manner.

A driver element 34 is preferably arranged in each case between the reception regions 33; for the sake of clarity, only two in each case are provided with reference numerals in FIGS. 4 and 5. The driver elements 34 are designed and adapted for engagement in the respective gap 26 between every two of the chain links 21. Especially preferably, the chain links 21 and the driver elements 34 are formed correspondingly to each other in such a manner that the engagement takes place in a positive-locking or largely positive-locking manner. For this, the driver element 34 is further designed and adapted preferably correspondingly to the end faces 24 forming the gap 26.

The invention claimed is:

1. A chain link for a support chain for supporting a compression belt in a separating device for separating materials of different flowability, the chain link having a support surface and an inner surface opposite said support surface, characterised in that a protruding support element is arranged on at least one end face of the chain link, wherein the inner surface comprises a concave contact region, wherein the support surface is convexly curved, and wherein the support element is convex in at least a first transition region between the support surface and the end face.

2. The chain link according to claim 1, characterised in that the support element is arranged step-free on the support surface.

3. The chain link according to claim 1, wherein a radius of curvature of the concave contact region is substantially similar to a radius of curvature of the support surface.

4. The chain link according to claim 1, characterised in that at least one second transition region between the first transition region and the inner surface is rounded.

5. The chain link according to claim 4, characterised in that a contour of the end face has at least one point of inflexion between the first transition region and the at least one second transition region.

6. The chain link according to claim 1, characterised in that the chain link is formed in one piece.

7. The chain link according to claim 1, characterised in that the chain link has at least two holes for receiving a chain pin, each connecting the chain links to each other in an articulated manner.

8. A support chain for a support apparatus for supporting a compression belt in a separating device for separating materials of different flowability, wherein
    the support chain comprises an articulated chain which has individual chain links connected to each other in an articulated manner, wherein the chain links are threaded onto chain pins extending transverse to a conveying direction of the support chain, and wherein the chain links are configured according to claim 1.

9. A support apparatus for supporting a compression belt in a separating device for separating materials of different flowability, the support apparatus comprising:
    a rotationally driven hollow drum with a circumferential surface,
    a continuous compression belt which is pressed against said circumferential surface of the hollow drum, and
    a first roller and a second roller that support the continuous compression belt,
    wherein the first roller is configured to press the compression belt against the hollow drum,
    wherein the support apparatus comprises a support chain, and
    wherein the support chain is configured according to claim 8.

10. The support apparatus according to claim 9, characterised in that at least one of the first and second rollers comprises a sprocket wheel, wherein the sprocket wheel comprises a plurality of reception regions that are shaped to substantially match contours of the inner surfaces of the chain links.

11. The support apparatus according to claim 10, wherein the support chain defines a gap between a first link and a second link of the support chain, wherein, arranged between two of the plurality of reception regions, at least one driver element is disposed on the sprocket wheel, and wherein the at least one driver element is arranged for engaging in the gap, said gap being limited by the respective end faces and the support elements.

12. The support apparatus according to claim 11, characterised in that the at least one driver element is shaped to correspond in shape to the end faces forming the gap.

* * * * *